No. 705,256. Patented July 22, 1902.
F. T. LEILICH.
BAR STITCHING MACHINE.
(Application filed Oct. 17, 1898.)
(No Model.) 9 Sheets—Sheet 1.
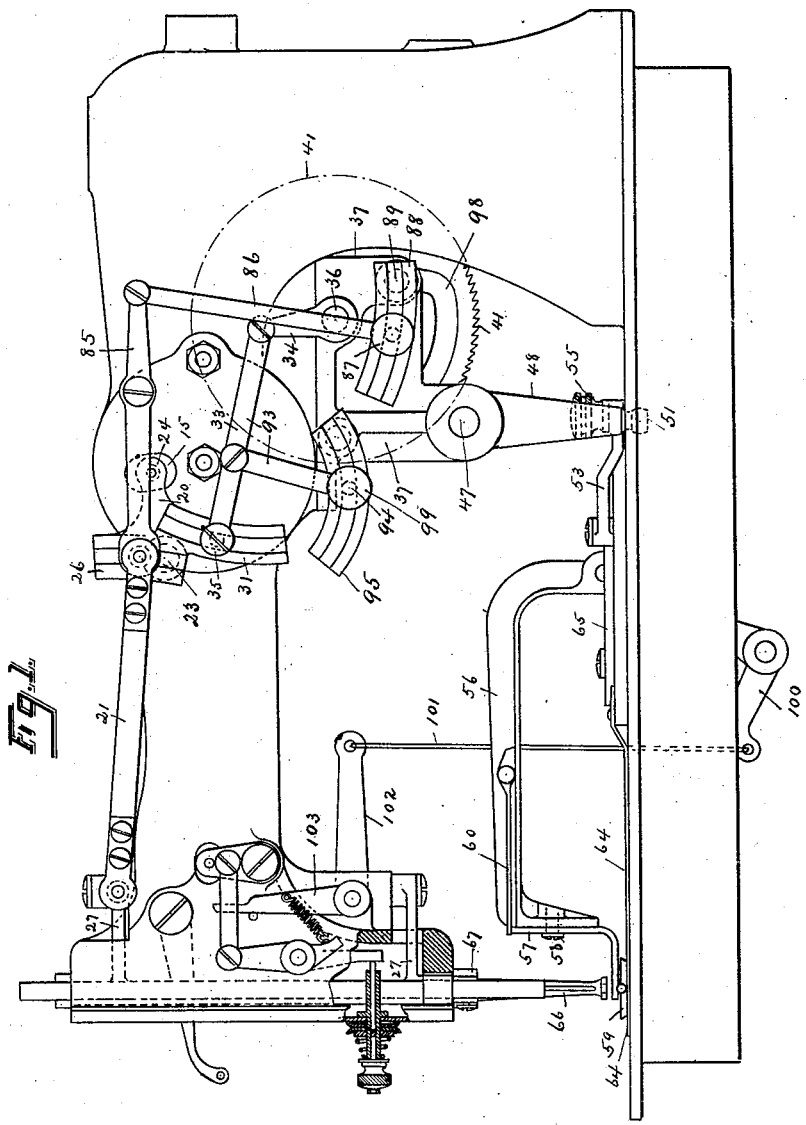
Witnesses
Jas. G. Simonton
W. W. Whitman
Inventor
Francis T. Leilich
By his Attorneys
E. F. Murdock & Co.
THE NORRIS PETERS CO., PHOTO-LITHO., WASHINGTON, D. C.

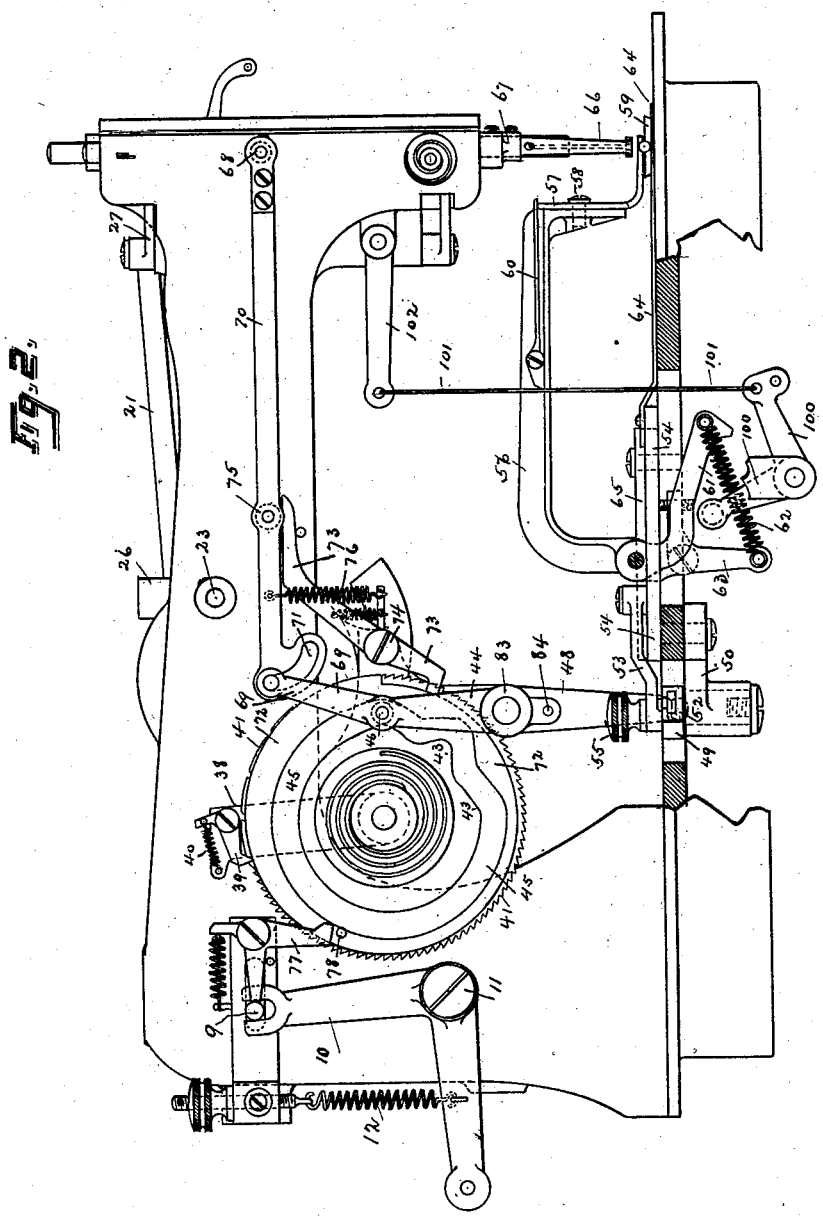

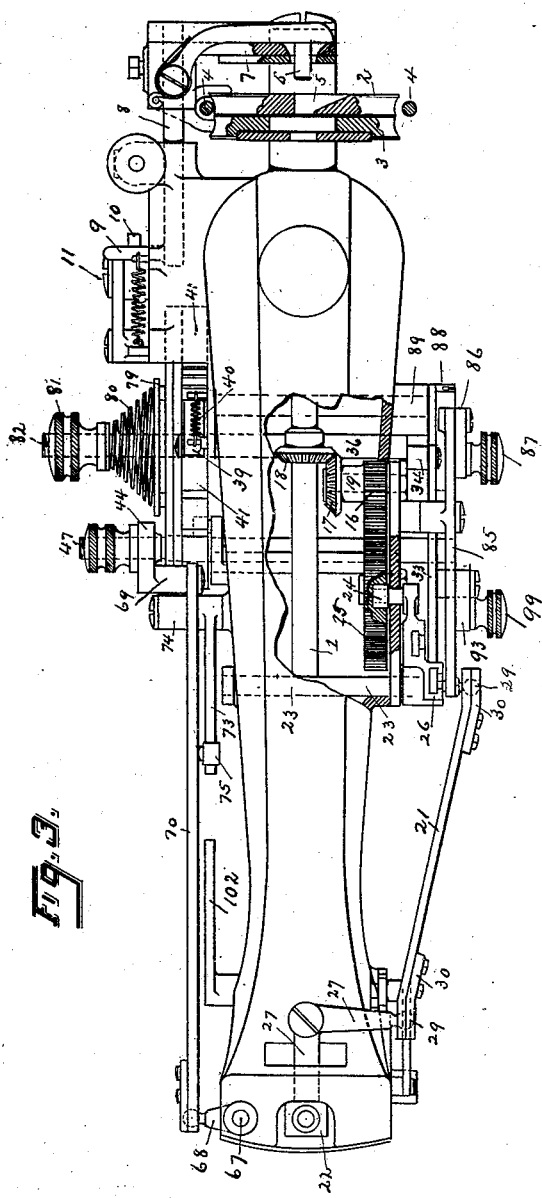

No. 705,256. Patented July 22, 1902.
F. T. LEILICH.
BAR STITCHING MACHINE.
(Application filed Oct. 17, 1898.)
(No Model.) 9 Sheets—Sheet 4.
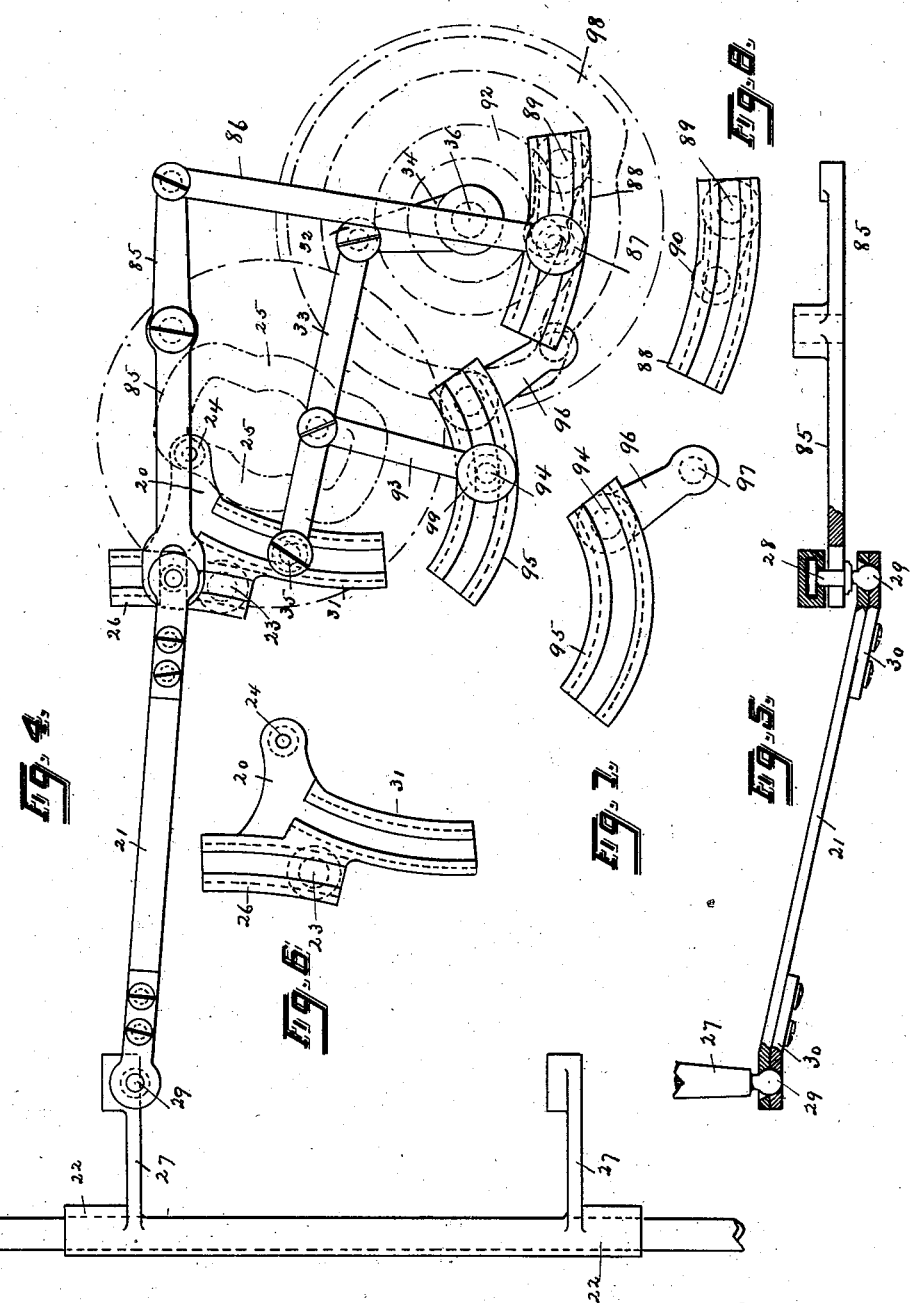
Witnesses
Inventor
Francis T. Leilich
By his Attorneys No. 705,256. Patented July 22, 1902.
F. T. LEILICH.
BAR STITCHING MACHINE.
(Application filed Oct. 17, 1898.)
(No Model.) 9 Sheets—Sheet 5.
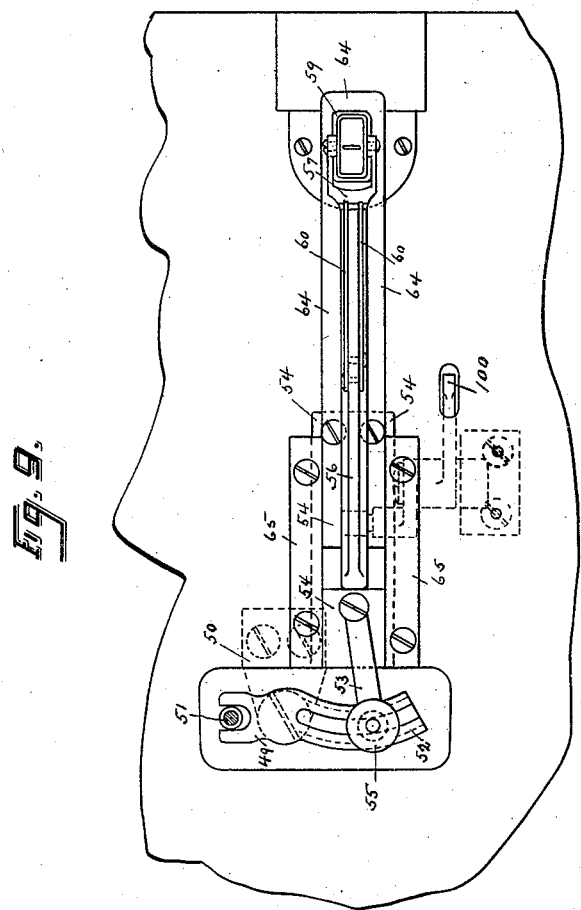

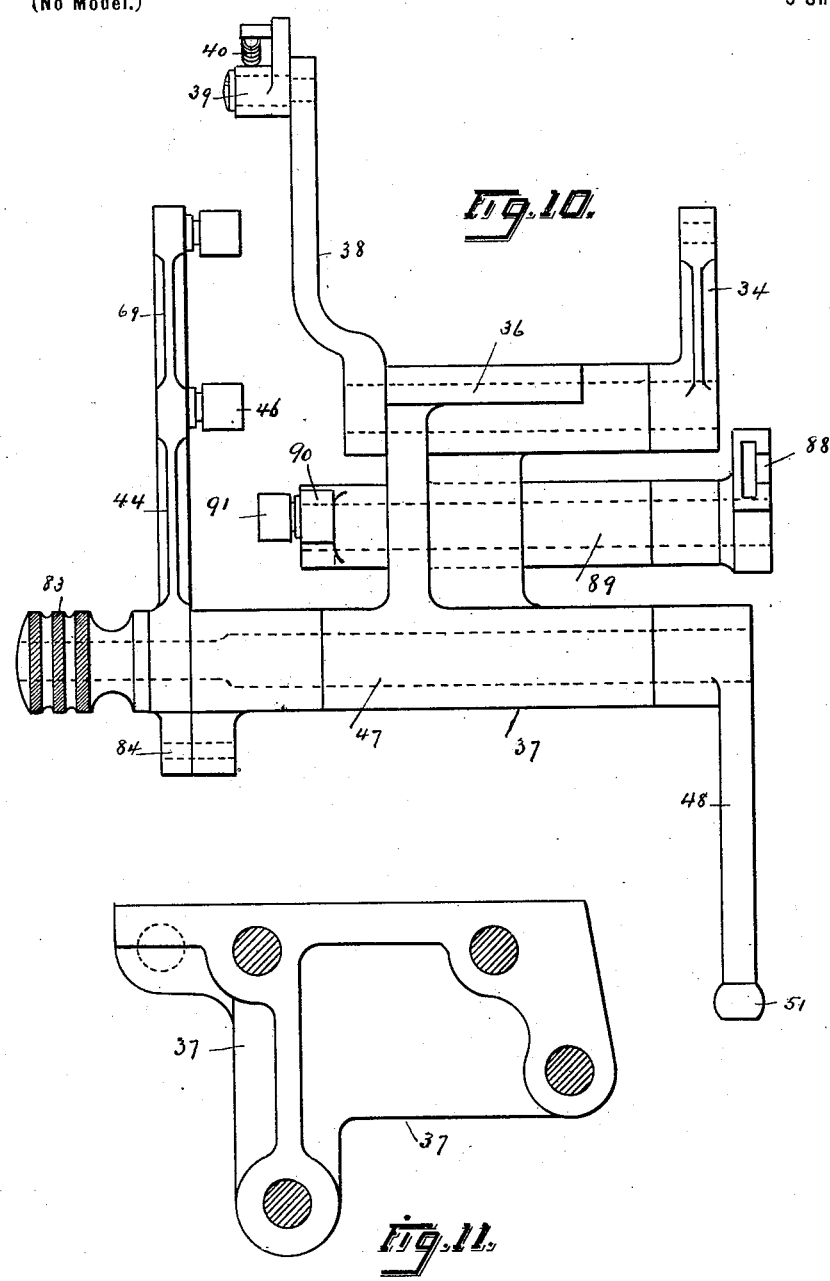
No. 705,256. Patented July 22, 1902.
F. T. LEILICH.
BAR STITCHING MACHINE.
(Application filed Oct. 17, 1898.)
(No Model.) 9 Sheets—Sheet 6.

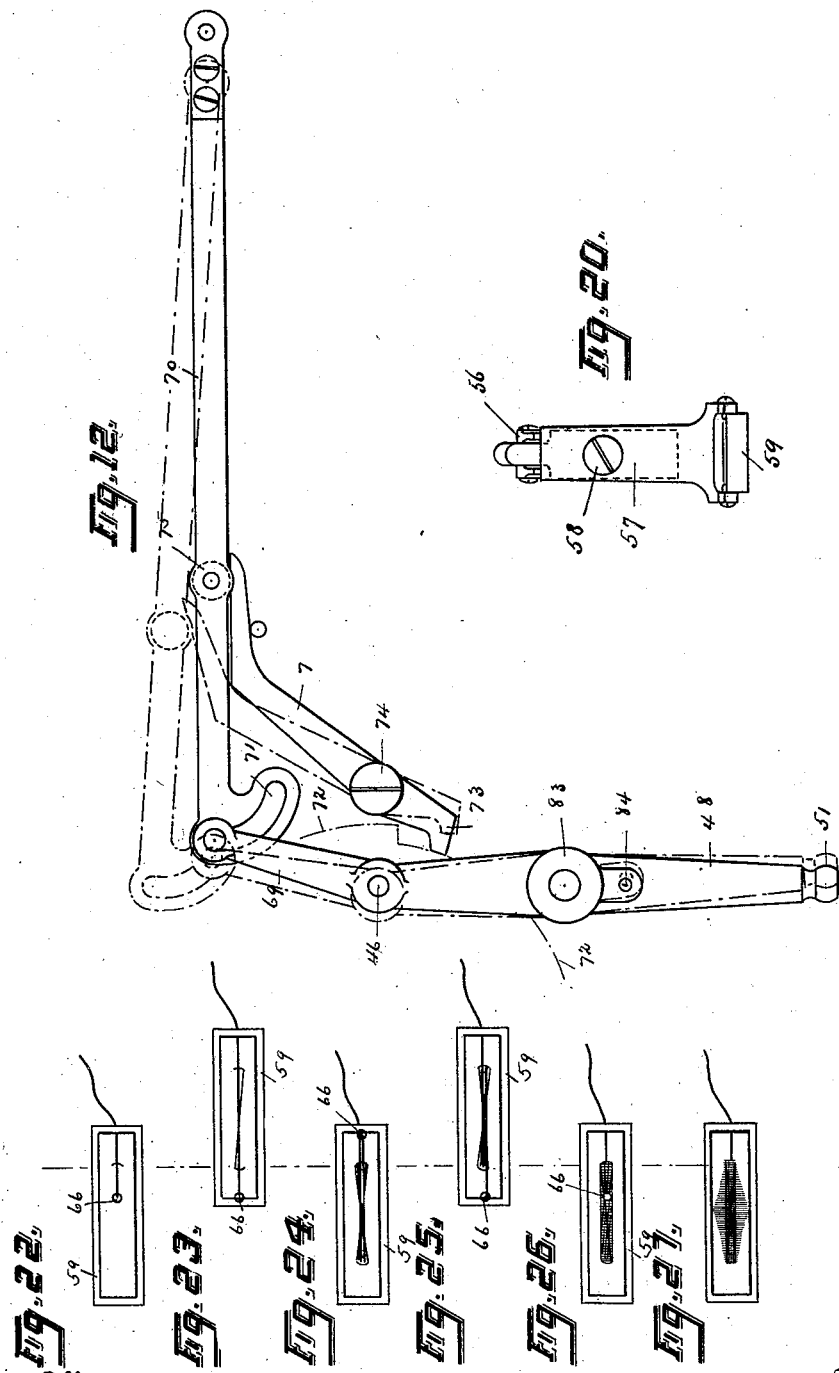

No. 705,256. Patented July 22, 1902.
F. T. LEILICH.
BAR STITCHING MACHINE.
(Application filed Oct. 17, 1898.)
(No Model.) 9 Sheets—Sheet 8.
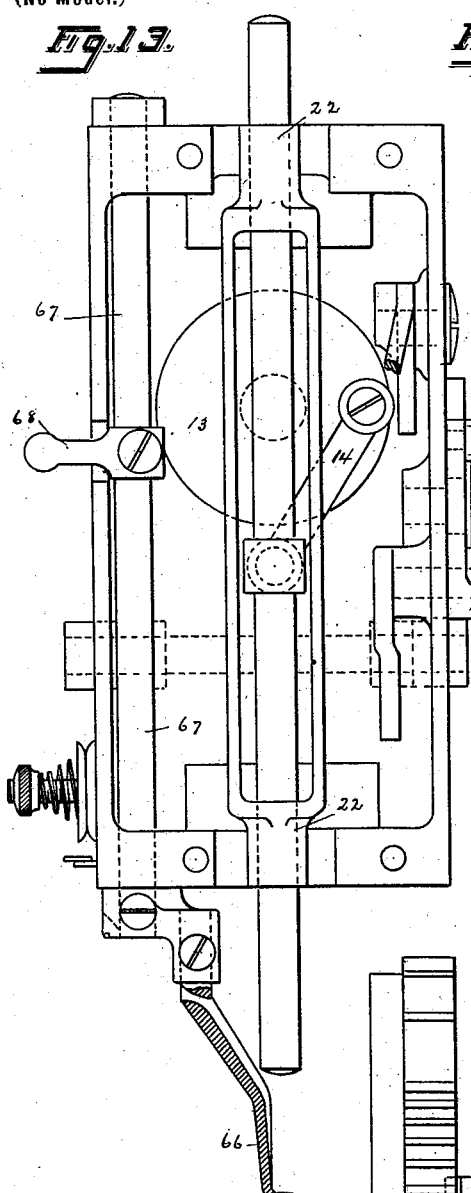
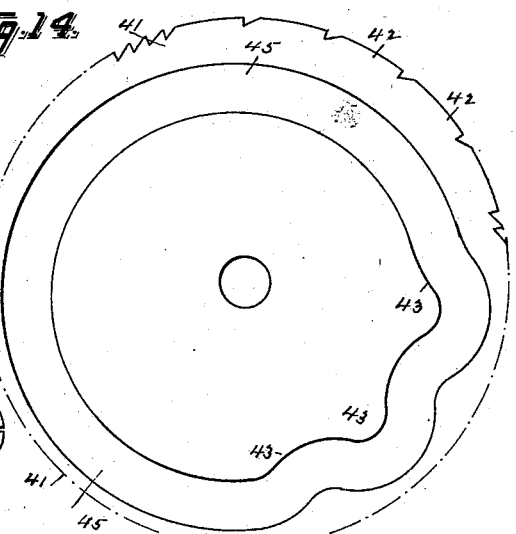
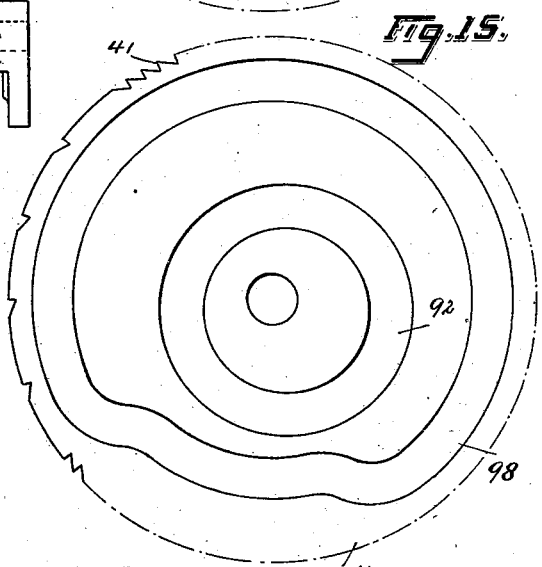
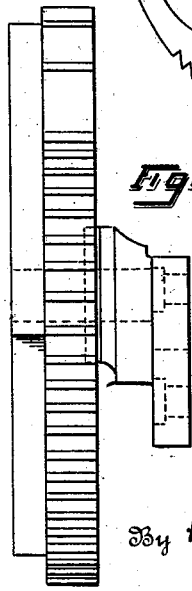
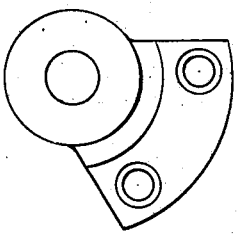
Witnesses
Jas. G. Simonton
W. W. Rohatman
Inventor
Francis T. Leilich
By his Attorneys
E. F. Murdock & Co.

No. 705,256. Patented July 22, 1902.
F. T. LEILICH.
BAR STITCHING MACHINE.
(Application filed Oct. 17, 1898.)
(No Model.) 9 Sheets—Sheet 9.
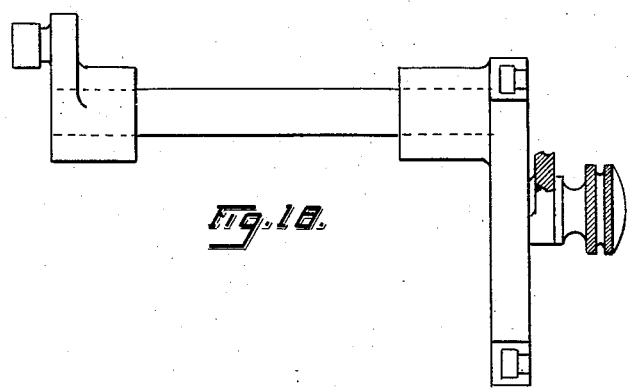
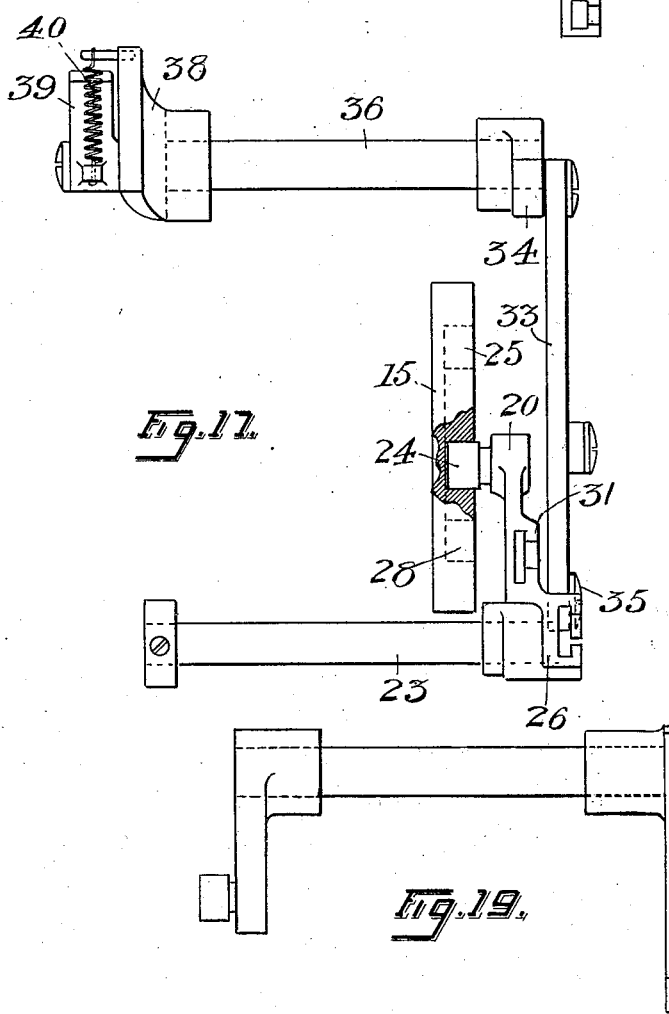

UNITED STATES PATENT OFFICE.

FRANCIS T. LEILICH, OF SAN FRANCISCO, CALIFORNIA, ASSIGNOR OF ONE-HALF TO JAMES G. SIMONTON, OF SAN FRANCISCO, CALIFORNIA.

BAR-STITCHING MACHINE.

SPECIFICATION forming part of Letters Patent No. 705,256, dated July 22, 1902.

Application filed October 17, 1898. Serial No. 693,810. (No model.)

*To all whom it may concern:*

Be it known that I, FRANCIS T. LEILICH, a citizen of the United States, residing at San Francisco, in the county of San Francisco and State of California, have invented certain new and useful Improvements in Bar-Stitching Machines; and I do hereby declare the following to be a full, clear, and exact description of said invention, such as will enable others skilled in the art to which it most nearly appertains to make, use, and practice the same.

This invention relates to improvements in that class of sewing-machines used for barring or tacking certain points of articles, such as the ends of buttonholes in shoes, the corners of pockets, and the like. By such machines a number of long threads or stitches are first laid down on the material side by side or overlying each other and secured at the ends to form a bar, and then this bar is progressively covered with a series of short transverse stitches.

In all present methods of barring, so far as my knowledge extends, whether practiced by hand or by machine, all of the thread that constitutes the bar or tack lying upon the upper surface of the material passes through the needle-eye, and when it is desired to make a bar or tack of great strength or to have it stand out in relief upon the fabric a large number of the barring or long threads must be laid and secured at each end before over or cross stitching them to the material.

In the practice of my invention when it is desired to secure a high relief or great strength in the bars or tacks I depend entirely upon the use of an extra or independent thread or cord that I do not pass through the needle-eye, which cord may be of any preferred material or size, preferably larger than the needle-thread. I extend this independent thread upon the surface of the material the length of the bar desired and secure it to the fabric by needle-stitches. I then return in the reverse direction both the independent thread and the needle-thread the length of the bar and secure them to the fabric by needle-stitches, and I thus extend to and fro and secure upon the fabric said independent thread and needle-thread until the desired number of folds of the threads are laid and secured, and then I over or cross stitch them all to the material.

Furthermore, it is the object of my invention to provide improved means for varying the number of stitches in cross-stitching the bar and to provide improved means for controlling and regulating the path of and extent of vibration of the needle-bar.

My invention further resides in the novel construction, combination, and arrangement of parts hereinafter fully specified, and particularly pointed out in the claims.

In the drawings, Figure 1 is a side elevation of a machine constructed in accordance with this invention. The lower part of the head is partly cut away to show the tension-operating device. The driving mechanism is omitted. Fig. 2 is a side elevation of the same, taken from the rear side. The bed-plate of the machine is partly cut away and shown in section to more clearly illustrate the clamp mechanism. The driving mechanism is omitted. Fig. 3 is a plan view of a machine constructed in accordance with this invention. The frame is partly cut away to show mechanism therein for vibrating the needle-bar. In this view the driving mechanism is shown, portions of which are cut away and shown in section. Fig. 4 is a detail view, enlarged, of the needle-bar-vibrating mechanism and a portion of the clamp feeding mechanism, together with the controlling mechanism for each. The driving cam-wheel and the pattern cam-wheel are both shown in broken-line construction, the cam-grooves being also shown by broken lines. Fig. 5 is a detail view of the connecting-rod for imparting a vibratory movement to the needle-bar carrier, the extension of the bell-crank lever to which it is connected, and the controlling-lever. The parts are broken away in section to show the construction. Fig. 6 is a detail view, in side elevation, of the bell-crank lever, by means of which movement is imparted to the vibrating and the clamp feed mechanisms. Fig. 7 is a detail view, in side elevation, of the extension and lever for controlling the feed clamp mechanism, the shaft to which they are connected, and the roller with which the lever is provided, both the latter being shown in dotted lines. Fig. 8 is a side view of the extension of the mechanism by which the needle vibration is controlled. In this view the lever, the roller with which it is provided, and the shaft upon which the lever and the extension are secured are shown in dotted lines. Fig. 9 is a plan view of that portion of the clamp feed mechanism which is mounted upon the bed-plate of the machine. In this view the clamp-raising and the tension-releasing mechanism is shown in dotted lines. Fig. 10 is an enlarged detail showing in their relative positions three of the shafts which cross from the front to the rear side of the machine. Fig. 11 is a detail view, in side elevation, of the bracket in which the various shafts are mounted. In this view the shafts are shown in section. Fig. 12 is an enlarged detail view of the lever and connecting-rod for imparting and controlling the action of the cord-guide. The position of the parts shown in dotted lines is that which is assumed at the completion of the operation of forming the bar. Fig. 13 is an enlarged detail view of the head of the sewing-machine, the front plate being removed. In this view the cord-guide is shown in section to illustrate the throat for the independent bar-thread. Fig. 14 is an enlarged detail view of the pattern cam-wheel, showing the face turned from the front of the machine and the cam by which the shifting action is imparted to the clamp feed mechanism. In this view the cam for controlling the cord-guide is omitted. Fig. 15 is an elevation of the same wheel, showing the reversed side. In this view are shown the two cams for operating the controlling mechanisms. Fig. 16 is an edge view of the pattern cam-wheel, showing the position of the cam for controlling the cord-guide and the mounting for the pattern cam-wheel. Fig. 17 is a detail view showing the driving mechanism for imparting an oscillatory movement to the arm and pawl to progressively rotate the pattern cam-wheel and the connections between said arm and the driving cam-wheel and bell-crank lever. Fig. 18 is a detail view in plan of the shaft, lever, and extension by which the mechanism shown in Fig. 17 is controlled. The connecting-rod is broken away in section. Fig. 19 is a detail view in plan of the shaft, lever, and extension by which the needle-bar-vibrating mechanism is controlled. The connecting-rod in this view is broken away in section. Fig. 20 is a detail view, in front elevation, of the presser-foot and shoe of the clamp. Fig. 21 is a front view of the separate mounting for the pattern cam-wheel, which is shown in side elevation at Fig. 16. Figs. 22, 23, 24, 25, and 26 are diagrammatic views illustrating by their successive positions the manner of forming the bar as performed by the present machine. The broken line connecting these figures indicates the path of the needle vibration. The small circle indicated in these views is the position of the cord-guide in the various steps in the operation. Fig. 27 illustrates a fancy-stitched bar such as made by the present machine and as caused by the pattern-cam shown in Fig. 15.

The driving mechanism consists, primarily, of the driving-shaft 1, which is mounted in bearings in the frame of the machine and extends to the head to operate the needle-bar and through the opposite end of the frame to receive the tight and loose pulleys 2 and 3. The driving force is applied to the shaft through a belt 4. The "tight" pulley, as it is called, is secured rigidly to the shaft beyond the loose pulley. It is provided with a depression 5, into which a finger 6 of the stopping mechanism extends. The face of the pulley 2 is provided with a smooth surface to receive a leather-covered brake-shoe 7. This shoe is mounted upon the end of a guide-rod 8, which is mounted in suitable guides stationarily secured to or integrally formed upon the frame of the machine. In the side of the rod is set a pin 9, which is engaged by the yoked end of a bell-crank lever 10, pivotally mounted at 11 on the frame of the machine. The other end of the said lever is provided with a spiral spring 12, the tension of which is exerted through the forked end 10, the pin 9, and the rod 8 to throw the shoe 7 against the pulley 2. This particular stopping mechanism will be found more fully set forth and described in an application, numbered 670,679, filed by me on the 17th day of February, 1898, and it is not herein claimed.

The forward end of the driving-shaft 1 is provided with any of the known and suitable forms of connection between the needle-bar and the said shaft, by means of which the former is reciprocated in guides provided for it in the head of the machine. In the present illustrations I have shown the usual crank-disk 13 and pitman 14 connection. In the present machine, the guides provided are given a lateral swing or oscillation. This is accomplished by mounting the needle-bar in a carrier which is pivotally swung upon a frame of the machine and receives an oscillatory movement from the mechanism hereinbefore termed the "needle-bar-vibrating" mechanism.

The needle-bar-vibrating mechanism receives its driving force from the cam-wheel 15. This cam-wheel 15 is connected with the driving-shaft through the pinion 16 and the mitered gears 17 and 18. The shaft upon which the pinion 16 and the miter-gear 17 are secured is mounted in a suitable bearing 19, secured to the frame of the machine.

The connections and mechanisms by which the needle-bar is vibrated laterally, as above mentioned, are mounted upon the front side of the frame of the machine. They consist of the lever 20, the connection 21, and carrier 22. The lever 20 is pivotally mounted in the frame upon the shaft 23, which extends through the frame, as is shown in Figs. 1, 3, and 5. The one arm of the bell-crank lever is provided with a stud and roller 24, extending into the cam 25, formed in the wheel 15. As the wheel 15 is rotated the cam raises and lowers the end of the arm 20, with which it is engaged by the roll and stud, causing the bell-crank lever 20 to oscillate upon the shaft 23. The arm 26 of the bell-crank lever is provided with an undercut curved slot the center of which is the connection between the arm 21 and the crank-arm 27 of the carrier. The engagement between the connecting-rod 21 and the undercut slotted arm of the bell-crank lever 26 consists of a stud 28, the head of which is fitted in the said undercut slot to be moved therein freely. Outwardly extending from the stud is a shoulder to receive the forked end of a lever 85 and having on the end the ball 29. A socket is formed in the end of the connection 21 by adding the small pieces 30. The outer face of the end of the connection and the under face of the added piece are so cut that when laid together they form a cup or ball-socket. This form of socket is provided at each end of the connection to permit the swing of the crank-arm 27 without cramping. When thus connected, it will be observed that as the wheel 15 is rotated the arm 20 of the bell-crank lever is raised and lowered, causing the bell-crank lever 20 to rotate the shaft 23 to throw the slotted arm 26 and the connection 21 backward and forward, which motion is transmitted through the crank-arm 27 to cause the carrier to oscillate about the pivotal center from which it is hung. It will be observed that by this construction the point of engagement between the connection 21 and the slotted arm 26 of the lever 20 may be varied with relation to the pivotal center of the lever to be approached to and receded from the center. This action results in a variable stroke being imparted to the connection 21 and the vibrating needle-bar carrier, increasing and diminishing the lateral vibration of the carrier and needle-bar.

The point of engagement between the connection 21 and the slotted arm of the bell-crank lever 20 is controlled by a controlling mechanism for the needle-bar reciprocation. The description of this controlling mechanism I will defer until later in the specification.

During the reciprocation of the needle-bar by the driving mechanism it will now be observed that through the connections between the said driving mechanism and the cam-wheel 15 there is by the mechanism just described imparted to the needle-bar a lateral vibration across a certain medium line of its operation, and while the engagement between the connection 21 and the slotted arm 26 remains constant in position the length of the vibration of the needle-bar will remain fixed and each successive stroke of the needle-bar will be equidistant upon the alternative side of the medium line referred to.

To form the "bar," it is necessary that the threads be laid to extend from the one end of the extremity of the bar to the other end. It is also necessary after laying these threads and securing them in their end positions to overstitch the said threads in simulation of what is termed in hand-sewing "whipping." The vertical reciprocation of the needle-bar and the lateral vibration of the needle-bar being fixed in their operative positions it becomes necessary to produce the effect referred to of laying the thread from end to end of the extremities of the bar by moving the material which is being provided with a bar. In the present machine this is accomplished by means of the clamp feeding mechanism.

The clamp feeding mechanism receives its driving power from the cam-wheel 15 through the bell-crank lever 20. For this purpose the said bell-crank lever is provided with a second extension or undercut slotted arm 31. The extension 31 is upon the opposite side of the pivotal center of the bell-crank lever 20 from that of the arm 26.

The extension 31 is formed to a curve, the center of which is the center of the pivotal connection 32 of the link 33 with the lever-arm 34. The engagement between the extension 31 and the link 33 is through a movable stud 35, which is extended into the undercut slot in such a manner as to be readily shifted along the slot. Likewise the amount of action or movement of the link 33 will be determined by the point of location of the engaging member or stud 35, with which the said link is provided. The movement so imparted to the link 33 is transferred by it to the lever 34, which is rigidly secured upon the end of the shaft 36, that extends through the bracket 37 to the opposite side of the machine. Integrally formed with the said shaft or rigidly attached thereto is an arm 38, having provided upon the outer end thereof a pawl 39 and a spiral spring 40, by means of which the pawl is retained upon the ratchet-toothed wheel 41. The ratchet-toothed wheel is mounted in an independent bearing 42, set out from the frame, as shown in Figs. 16 and 21. The mountings of the wheel 41 and the shaft 36 are alined so that the arc of the movement of the arm 38, carrying the pawl 39, is preferably concentric with the periphery of the wheel 41.

The pattern cam-wheel 41 is cut on its periphery with ratchet-teeth of two different pitches. The larger teeth correspond in their relation to the pawl 39 with the relation of the cam-roll and stud 46 on the lever 44 to those inclines 43 of the pattern-cam 41 by which, through the other coöperating elements, the clamp and material are moved quickly from end to end in the laying of the barring-threads. The smaller teeth of the pattern cam-wheel 41 correspond in the same relation to the long incline of the cam 45, by which the clamp and material are returned slowly during the operation of cross-stitching the bar. This difference in the relative pitch of the teeth in the pattern cam-wheel is required for the necessary adjustment of the machine in forming bars of varying lengths with varying sizes of threads and numbers of over or cross stitches. In other words, the construction of this feature of the machine is such that when vibrating the clamp to lay the bar-threads the larger teeth are used and when cross-stitching them the smaller teeth are used. It is necessary for the pattern cam-wheel 41 to always move the space of one large tooth when laying the barring-threads. It is also desirable when making bars of different lengths to regulate the number of cross-stitches so that, if desired, a short bar may be given relatively to its length the same number of cross-stitches as a long one. It is evident, therefore, that in a bar requiring few cross-stitches a motion of the pawl 39 equal to the pitch of several of the smaller teeth will be required to move the pattern cam-wheel 41, and as this movement is regulated by the position of the set-nut 99 in the lever 95 the throw or movement of the pawl will in the greater movements be greater than the pitch of the larger teeth; but in the range of adjustment of which this element of the machine is capable this increased movement of the pawl 39 can never be great enough to move the pattern cam-wheel 41 more than one of the larger teeth, and with the smallest adjusted movement of the pawl 39 it can never move less than one of the larger teeth. Thus any adjustment of the spacing of the over-stitches along the bar can be made without altering the feed of the cam when shifting the clamp to lay in the barring-threads.

The point of engagement between the connection 33 and the extension 31 of the bell-crank lever 20 is maintained by a controlling mechanism later described.

The ratchet-toothed wheel 41 is provided in its outer face with a cam-groove 45, cut to produce as many full vibrations of the clamp as there are cords to be laid. The last full vibration will place the material in the position with reference to the needle so that the same is making a vibration or stitch over the one extremity of the bar. From this point, which is either the highest or the lowest of the cam-groove, a long gradual incline is provided in the cam, which will gradually return the clamp to present the opposite extremity of the bar to the operation of the needle. In doing so it will be observed that the needle continuing its vibratory action has stitched the bar between the two ends thereof.

Extending into the cam 45 is a stud and roller 46, which is mounted upon the end of a lever 44, as shown in Figs. 2 and 10. The said lever is rigidly attached to the end of the shaft 47, which extends across the machine-frame in the bracket, and is there provided with a downwardly-extending arm 48.

The lower end of the arm 48 is extended through a slot provided in the bed-plate of the machine and enters between the forks of a horizontal lever 49, pivotally mounted upon a bracketed bearing 50, secured to the under side of the said bed-plate. At the point of connection the lower end of the arm 48 is provided with a ball 51 to permit a rocking action between the engaged parts. The lever 49 is provided at the opposite extension beyond its pivotal bearing with an undercut slotted extension 52. This extension is given a curved shape, the curve being struck from the center of the pivotal connection of the rod 53 with the slide 54.

The rod 53 is engaged with the extension 52 by means of a stud the head of which extends under the undercut flanges of the slot and which is provided with a screw-thread engaged by a set-nut 55. By means of this construction the vibration of the lever 52 and the clamp may be regulated to produce a greater or lesser movement relative to the mechanism above described and which is engaged with the lever 52 by means of the downward-extending arm 48. This engagement is regulated and set by hand, and as it is extended from the pivotal center of the lever the vibration of the parts to which it is connected is increased. By means of this construction the machine may be adjusted easily and readily to produce "bars" of varying lengths within the limits of the construction.

Thus far there has been described the mechanism by means of which the clamp is moved or vibrated. The clamp proper consists in the arm 56, which is raised or arched to permit the accumulation of material beneath it. It is pivotally mounted or hinged upon the slide-block 54. In the forward end next to the needle-bar the arch is provided with a presser-foot 57, which is pivotally attached to the arm 56 by means of a screw 58. The presser-foot 57 is provided with a shoe 59. The shoe 59 is constructed in the shape of an open frame, the opening of which exposes the cloth held by the clamp over the full length of the bar and is connected to the presser-foot by a pivotal or hinged connection. By this construction the shoe is permitted to seat itself upon unequal surfaces, such as might arise from inequalities in the thickness of the work caused by the folding of the material upon which the bar is being formed. The presser-foot is maintained level or vertical above the cloth by the flat finger-springs 60 60, which are mounted upon the arm 56 and extend over and rest upon the top of the vertical extension of the said presser-foot. These springs permit the presser-foot 57 to rock or tilt laterally. The arm 56 is provided with an extension 61 below the bed-plate of the machine. This extension 61 is connected by a spiral spring to a bent lever 63, which is pivotally mounted in bearings upon the clamp-slide 54 below the bed-plate of the machine and has provided in the end opposite to that engaged by the spring 62 a screw the end of which bears against the clamp-slide. By turning this screw the bent lever is moved upon its bearing, by which the tension of the spiral spring 62, and thereby the pressure of the arm 56, upon the goods is increased or diminished. The clamp is completed by the cloth-plate 64. This is provided with an opening of slightly-larger dimensions than the opening of the shoe. The plate 64 is connected rigidly to the sliding block 54.

When engaged by the clamp, the material is carried and held between the shoe 59 and the end of the cloth-plate 64, and as these two are moved the material is carried with them. The movement of the entire clamp and sliding block 54 is guided by the gibs 65, secured to the frame of the machine.

It will now be seen that starting from the driving mechanism, by means of which the needle-bar is reciprocated in its vertical direction, there is simultaneously imparted to the needle-bar by means of the vibrating mechanism a vibration laterally, and simultaneously therewith the clamp is shifted backward and forward across the line of lateral vibration of the needle imparted by the vibratory mechanism; also, that the clamp is given a predetermined number of quick full-length vibrations, which are timed with the needle reciprocating and vibrating mechanisms to place a stitch on each side of the bar at each end of the full vibration of the clamp; also, that after the predetermined number of quick full vibrations of the clamp are made it is then moved slowly or irregularly across the path of the vibration of the needle for the purpose of allowing the needle to overstitch by a succession of vibrations more or less of the length of the thread, as desired, which in the preliminary action has been extended between the two ends of the bar.

By means of the mechanism thus far described barring and tacking according to the present method can be accomplished; but it is my purpose in this mechanism in addition thereto to utilize the new method of barring and tacking hereinbefore described as one of the objects of this invention. To accomplish this, I have introduced from an outside source a cord which is fed across the vibratory path of the needle by a cord-guide 66. This guide is mounted upon a vertical shaft 67 in suitable bearings in the head of the machine-frame.

It is the object of the present mechanism to vibrate the end of the cord-guide across the path of the vibration of the needle and in a direction opposite from that of the clamp and by so doing to lay the cord carried by the guide 66 across the path of the needle vibrations at the end of the bar to be constructed. To produce this action, the shaft 67, to which the guide 66 is connected, is provided with an outwardly-extended arm 68, which is rigidly connected to the shaft. This arm 68 is connected to the upper extension 69 of the arm 44, formerly described as engaging the slot at 45 in the wheel 41. The extension 69 is on the opposite side of the pivotal bearing from the downwardly-extending arm 48 of the clamp mechanism. By this construction these extensions are simultaneously moved in opposite directions. Thus the action of the cord-guide is to throw the cord in the direction opposite to the travel or shift of the clamp. It will now be observed that the action of the two mechanisms—the one controlling the clamp, the other controlling the cord-guide—being operated directly from the same source is such that in the final action of the clamp, where the needle is oversewing between the extremities of the bar, the guide would be slowly moving in the direction opposite to the clamp, but across the path of the needle. Unless this action of the guide were arrested it would ultimately fall directly in the path of the needle. It is for this purpose that the end of the connecting-rod 70 which is engaged by the end of the extension 69 is provided with a curved slot 71, which during the full vibrations of the clamp engages the connecting-rod 70 in the position shown in Fig. 2, thereby producing the full stroke of the guide simultaneously with the full vibration of the clamp. When the roller 46 reaches that portion of the cam 45 which is cut to control the action of the clamp to gradually retract the same, then it becomes necessary to prevent a similar action on the part of the connection between the guide 66 and the extension 69. This has been provided for by means of the above-mentioned slotted connection at the end of the connecting-rod 70 and by a wiper-cam 72, which is constructed on the periphery of the cam-wheel 41 and the lever 73, fulcrumed on the arm of the machine which bears upon the face of the said wiper-cam at the one end and at the other end rests under a roller or extension mounted upon the side of the connecting-rod 70. The wiper-cam 72 is cut to gradually throw the end of the lever 73 resting upon it away from the center of the wheel 41, thereby causing the said lever to rotate upon its bearing 74 and raise the end in engagement with the roller 75 upon the connecting-rod 70. In raising this connecting-rod the slot 71 is raised upward over the connection of the extension 69 with the connecting-rod 70. This slot being so constructed produces in being raised the action of a cam over the connection with the extension 69. This draws the connecting-rod 70 backward, the effect of which is to extend the guide forward. This action takes place as the extension 69 is receding, and the downward-extended arm 48 is gradually moving forward to retract the clamp holding the material. The resultant of these two actions is that the guide remains substantially stationary in the position it was at the end of the last full vibration of the clamp and during the receding of the clamp and while the needle is oversewing the barring-cord. The connecting-rod 79 and the lever 73 are both provided with spiral springs 76 76, attached to the frame of the machine, by which they are returned to their normal positions, or positions from which they are removed by the action just described.

The duration of the operation of the machine is governed by the stopping mechanism hereinbefore mentioned as contained in a former application and the releasing mechanism or trigger 77. This trigger is pivotally mounted upon the frame of the machine and is provided with two arms, the one extending into the path of the pin 9 of the stopping mechanism and the other extending into the path of the pin 78, set into the face of the wheel. When the pin 78 presses against the arm of the trigger, the latter is thrown into such a position, carrying the arm resting against the pin 9 out of the path of the same, thereby releasing it and permitting the stopping mechanism to operate to arrest the action of the driving mechanism. This mechanism is similar to that described in the former application above mentioned, and no claim is made to it specifically in the present application. This action, however, takes place at the completion of the bar and while the guide is yet in its abnormal position just described and when the bar is completed, so that immediately after the machine has again started and made the first two stitches over the bar thread or cord the end of the lever 73, which has forced the connecting-rod 70 upward to produce the abnormal position of the guide 66, falls over the end of the moving wiper-cam and permits the spring 76 to draw the connecting-rod 70 to its normal position, as shown in Fig. 2, which immediately carries the guide to its normal position.

The pattern cam-wheel 41 is provided with a friction device to prevent any irregular movement. This friction device consists in a plate 79, against which rests a spiral spring 80, the tension of which is governed by a nut 81 upon the threaded portion of the shaft 82, upon which the wheel 41 is mounted.

For structural reasons the extension 44 is connected to the shaft 47 by means of a set-nut 83 and a dowel-pin 84. The reason for this construction is that in order to remove the wheel 41 this extension is previously removed.

What has herein been termed the "controlling mechanisms" are provided to regulate the length of the vibrations of the needle bar and carrier in the one instance and the movements of the clamp for holding the material in the other instance. The control of each is effected by the moving point of engagement of the connections 21 and 33 with the extensions 26 and 31 of the lever 20. As before stated, the position of these points of engagement regulates the amount of movement which is imparted by the lever 20 through the said connections of the mechanisms with which they are connected.

The stud 28 is engaged by the lever 85, which is mounted on the frame of the machine. At the forward end this lever is forked to straddle the neck of the said stud and at the rear end is engaged by the connection 86 and a stud 97 to the undercut slotted extension 88. The slotted extension 88 is set rigidly upon the end of a shaft 89, which is extended through and mounted in bearings in the bracket 37. Extending from the other end of the shaft 89 is a lever 90, provided with a stud and roller upon its end. The stud and roller is provided to extend into, and be engaged by, the cam-groove 92, cut in the inner face of the wheel 41. The cam-groove 92 operates upon the stud and roller 91 to rock the shaft 89 to oscillate the extension 88 and through it the connection 86 and lever 85. In transmitting the movement to the lever 85 the forward or forked end is raised and lowered, moving the point of engagement between the extension 26 and connection 21 toward or away from the pivotal center of the bell-crank lever.

The cam-groove 92 may be cut to any desired form to produce variations in the character of the cross-stitching. In the present application I have shown this cam-groove as partially concentric and partially eccentric. (See Fig. 15.) The effect of this is to produce the form of stitching shown in Fig. 29. The control is particularly directed to the overstitching which transpires after the bar-threads have been laid in. In the form shown in the drawings at Fig. 27 the stitching is gradually increased to a maximum length in the center of the bar and diminished to the size of the initial stitch at the end of the bar. While this controlling mechanism is desirable and I may produce various effects with it, it is not essential in making the ordinary bar. The lever 85 and the parts connected with it may be removed from the machine, and the point of engagement between the connecting-rod 21 and the extension 26 may be fixed and set by hand by the use of the same construction shown in other parts of the machine, where a set-nut is used.

The controlling mechanism for controlling the feed of the clamp to hold the material consists of the connection 93, the shaft 94, the extension 95, and the lever 96. The shaft 94 is extended through and mounted in bearings in the bracket 37. The crank 96 is provided at the end with a stud and roller 97, which extends into the cam-groove 98, cut in the inner face of the cam-wheel 41. The connection 93 is engaged with the extension 95 by a stud 99, which is provided with a set-nut, as shown in the drawings. The connection 93 is pivotally connected to the connection 33, by means of which the movement is transmitted from the lever 20 to the shaft 36, which operates to rotate the pattern cam-wheel 41. The engagement between the connection 33 and the extension 31 of the lever 20 is what has been termed a "working fit," or an engagement adapted to be moved lengthwise the slotted extension 31. It will be observed that by means of this controlling mechanism the length of the stroke of the connection 33 and the members of the machine which are affected thereby may be increased or diminished by the cam 98, which would rock the shaft 94 to raise or lower the connection 33 by means of the connection 93 and the extension 95.

The whole operation of both of what has herein been called the "controlling mechanisms" may be set to produce a finer or coarser variation in the operation of the mechanisms controlled by them by shifting the engagement between the connections and the extensions 88 and 95 by means of the set-nuts provided therefor.

When it becomes necessary at the completion of the bar to remove the material, the clamp-arm 56 is raised. This is done by means of the lever 100, which is mounted in suitable brackets under the bed-plate of the machine. One arm of the lever 100 extends under to engage the arm 61 of the clamp-arm 56, while the other arm of the lever 100 is connected, by means of a rod 101 or other suitable connection, to a lever 102, mounted in the forward end of the machine. The arm 103 of the lever 102 engages the tension device for the needle-thread, so that when the lever 100 is depressed to raise the clamp-arm 56 the arm 103 is thrown into engagement with the tension device to release the same. The levers 100 and 102 may be operated by foot, knee, or hand.

At Figs. 22 to 26 is shown in diagrammatic manner the method followed for forming the bar. It will be observed by these figures that the guide in Fig. 22 is in its abnormal position with reference to the clamp-shoe 59. This is the position in which the guide was left at the completion of the bar and when the guide-operating mechanism is in the position shown by dotted lines in Fig. 12. In Fig. 23 the clamp-shoe 59 is shown in its position in which the second end stitch is laid, with the guide 66 in its normal position with reference to the shoe, but in the same position shown in the previous figure. In this view the clamp has been advanced by the cam-incline 43, and the cord-guide controlling or operating mechanism has been returned to the position shown in full lines in Fig. 12. With the change in the cord-guide-operating mechanism the throw of the extension 69 is compensated, so as to maintain the cord-guide in the position shown in both Figs. 22 and 23. The barring-thread is shown in these figures as caught under the forward edge of the shoe 59, where it is held throughout the operation by the full force of the spring tension. When the shoe is shifted from the position shown in Fig. 22 to that shown in Fig. 23, the barring-thread is carried with the shoe and laid across the path of the needle vibration. The needle-bar thread is also laid in from the one end of the bar to the other, as shown in Fig. 23. In Fig. 24 the third position is shown, in which the shoe 59 is carried to the first position, while the cord-guide has been vibrated across the path of the needle to the forward side thereof, carrying the barring-thread across the path of the needle vibration to receive the stitches at the forward end of the bar. In Fig. 25 is shown the fourth position, in which the shoe 59 is shifted forward to the full limit of the stroke, while the cord-guide 66 has been returned in the opposite direction of laying the barring-thread across the succeeding stitches at the end of the bar. From this position the shoe 59 is gradually and slowly receded to the position shown in Fig. 26, during which movement of the clamp the overstitching of the bar-threads has occurred. During the last-mentioned operation of the clamp the cord-guide-operating mechanism has been gradually thrown into the position shown in dotted lines at Fig. 12, the effect of which is to maintain the cord-guide 66 in the position shown in Figs. 25, 26, and 22. It will now be observed that by means of this mechanism I have produced a bar which is very strong and of a full rounded character and beautiful appearance by the introduction of the independent thread or cord.

Having thus described this invention, it is claimed—

1. In a sewing-machine, the combination of a laterally-vibrating needle-bar, a clamp for the work, a cam-wheel having a cam operatively connected with said clamp to shift the same, said cam having a series of undulations for shifting the clamp quickly through the full extent of its reciprocations, followed by an incline for shifting the clamp slowly, means for feeding said cam step by step and means for varying the extent of said feed, substantially as described.

2. In a sewing-machine, the combination of a laterally-vibrating needle-bar, a clamp for the work, a cam-wheel having a cam operatively connected with said clamp to shift the same, said cam having a series of undulations for shifting the clamp quickly through the full extent of its reciprocation, followed by an incline for shifting the clamp slowly, means for feeding said cam step by step and means for varying the extent of said feed, said means being operated by said cam in its revolution, substantially as described.

3. In a sewing-machine, the combination of a laterally-vibrating needle-bar, a clamp for the work, a cam-wheel having a cam operatively connected with said clamp to shift the same, said cam having a series of undulations for shifting the clamp quickly through the full extent of its reciprocation followed by an incline for shifting the clamp slowly, a pawl, and means connected with the driving-shaft for variably vibrating the same, said cam having two series of ratchet-teeth of different sizes, with which said pawl engages, to correspond with the variations in the vibrations of the pawl, substantially as described.

4. In a sewing-machine, the combination of a laterally-vibrated needle-bar, a clamp for the work, a cam-wheel having a cam operatively connected with said clamp to shift the same, a rock-shaft, a pawl vibrated thereby and feeding the cam-wheel, an arm carried by said rock-shaft, a link operatively connecting said arm with said pawl to impart its said vibrations thereto, the end of said link being movable along said arm, and means operated by said cam-wheel, for so moving said link to vary the feed, substantially as described.

5. In a sewing-machine the combination of a rock-shaft carrying a vibrating arm, a link having its end movable along a vibrating arm of the rock-shaft and operatively connected with the needle-bar to vary the same, a clamp for the work, a cam-wheel for shifting the same, a vibrating pawl-carrying arm for feeding said cam-wheel, a link having its end movable along a vibrating arm of the rock-shaft and operatively connected with the pawl-carrying arm to vibrate the latter, and means, operated by said cam-wheel, for independently shifting the end of each link along a vibrating arm on the rock-shaft, substantially as described.

6. In a sewing-machine the combination of a vibrating needle-bar, a clamp for the work, a cam-wheel for shifting the same, said cam-wheel having two series of teeth of different sizes, a vibrating pawl-carrying arm, said pawl engaging said teeth, means for vibrating said arm, and means, operated by said cam-wheel, for varying the extent of vibration of said pawl to correspond with the size of the teeth, substantially as described.

7. In a sewing-machine the combination of a needle-bar, means for vibrating the same, a clamp for the work, a cam-wheel for shifting the clamp, means for feeding the cam-wheel, means, operated by the cam-wheel, for varying the extent of vibration of the needle-bar, and means, operated by the cam-wheel, for varying the rapidity of feed of the cam-wheel, substantially as described.

8. In a sewing-machine, the combination of a transversely-vibrating needle-bar, a clamp for the work, means for longitudinally reciprocating said clamp quickly during a small number of vibrations of the needle-bar, and then slowly during a large number of said vibrations, a device carrying an independent cord, and means, coöperating with the clamp, for laying down said cord on the cloth in a line parallel with the reciprocation of the clamp, and centrally of the vibrations of the needle-bar, substantially as described.

9. In a sewing-machine, the combination of a needle-bar, a clamp for the work, means for reciprocating one of said elements transversely relatively to the other, means for longitudinally reciprocating said clamp quickly during a small number of said transverse reciprocations and then slowly during a large number thereof, a device carrying an independent cord, and means coöperating with the clamp, for laying down said cord on the cloth longitudinally of the clamp, substantially as described.

10. In a sewing-machine, the combination of a needle-bar, a clamp for the work, means for reciprocating one of said elements transversely relatively to the other, a device carrying an independent cord, and means for simultaneously reciprocating said clamp and device in opposite directions, substantially as described.

11. In a sewing-machine, the combination of a needle-bar, a clamp for the work, a rock-shaft, means, driven by said rock-shaft, for reciprocating one of said elements relatively to the other, a cam-wheel driven step by step by said rock-shaft, a device carrying an independent cord, said clamp and device being reciprocated simultaneously in opposite directions by said cam-wheel, and independent means actuated by said cam-wheel for shifting said device, substantially as described.

12. In a sewing-machine for forming a bar, in combination with a stitch-forming mechanism comprising a laterally-vibrated needle; of a driving mechanism; a clamp to hold the material in the vibratory path of the said needle; a feeding mechanism for the said clamp adapted to move the same over the entire length of the bar for a predetermined number of movements and then return the clamp across the path of the said needle slowly for the entire length of the bar to overstitch the bar-threads as laid in; a cord-guide pivotally mounted on the frame of the machine and adapted to vibrate across the vibratory path of the needle parallel to the movement of the said clamp; and a connecting mechanism to vibrate the said cord-guide, substantially as described.

In testimony whereof I have hereunto set my hand this 3d day of September, 1898.

FRANCIS T. LEILICH.

Witnesses:
E. F. MURDOCK,
BALDWIN VALE.